Aug. 23, 1960 J. R. BAYSTON 2,949,752
ICE MAKING MACHINE
Filed May 1, 1957 3 Sheets-Sheet 1

INVENTOR.
John R. Bayston
BY
L. F. Hammond
Atty.

Aug. 23, 1960     J. R. BAYSTON     2,949,752
ICE MAKING MACHINE

Filed May 1, 1957     3 Sheets-Sheet 2

INVENTOR.
John R. Bayston
BY
L. F. Hammond.
Atty.

Aug. 23, 1960

J. R. BAYSTON 2,949,752

ICE MAKING MACHINE

Filed May 1, 1957

INVENTOR.
John R. Bayston
BY
L. F. Hammond
Atty.

United States Patent Office 2,949,752
Patented Aug. 23, 1960

2,949,752

ICE MAKING MACHINE

John R. Bayston, 808 Junior Terrace, Chicago, Ill.

Filed May 1, 1957, Ser. No. 656,366

8 Claims. (Cl. 62—320)

This invention relates to ice making machines and particularly to an automatic self-contained machine for the production of ice cubes. It is the general aim of the invention to provide an automatic ice machine which is more efficient than machines for the same general purpose now available on the market, yet which is simpler in design and construction, and at the same time capable of producing a superior product.

It is a more specific object of the present invention to provide an automatic ice machine wherein the production of ice in cube form is accomplished by first freezing ice in elongated "bars" or "sticks," and then cutting the bars into individual cubes. By this expedient, it is practicable to produce an end product having a high degree of dimensional uniformity, with almost perfect clarity, and of purity considerably exceeding the purity of the water supply from which the ice is frozen.

It is a further object of the invention to provide a machine capable of automatically producing high quality ice cubes, as indicated above, wherein the mechanism is nevertheless capable of a high degree of thermal efficiency during freezing, to provide a maximum amount of ice for the power consumed.

According to the present invention the foregoing objects are accomplished by providing an ice making machine wherein the freezing unit includes a plurality of vertically extending cells or "columns," each square in cross section but with a height considerably greater than its width. With this arrangement the ice is frozen in a plurality of individual "sticks" or "bars" which are severed into cubes after being released from their freezing cells. In the preferred practice of the invention, water is frozen within cells of fixed dimension to produce bars of uniform size and shape, yet the freezing is accomplished under conditions of continuous flow so that there is insufficient expansion to damage the cells. The continuous flow freezing process also permits impurities in the water supply to be separated from the ice by the freezing process itself, the impurities present in the supply water being discharged with the dreg water of the machine.

The foregoing results are accomplished by introducing free flowing water into refrigerated freezing cells through a plurality of vertically spaced water inlet ports, while allowing the excess water to discharge from the bottoms of the cells or through any one of a plurality of outlet openings in their side walls. Overflow water is recirculated through the ice cells until thee freezing cycle is completed. The ice is then released from the freezing cells by heating the walls of the cells just enough to loosen the ice. The elongated bars of ice are thereafter sawed into cube shapes of uniform dimension by automatic mechanism.

A preferred embodiment of the invention is illustrated in the drawings of this specification, wherein.

Figure 1:
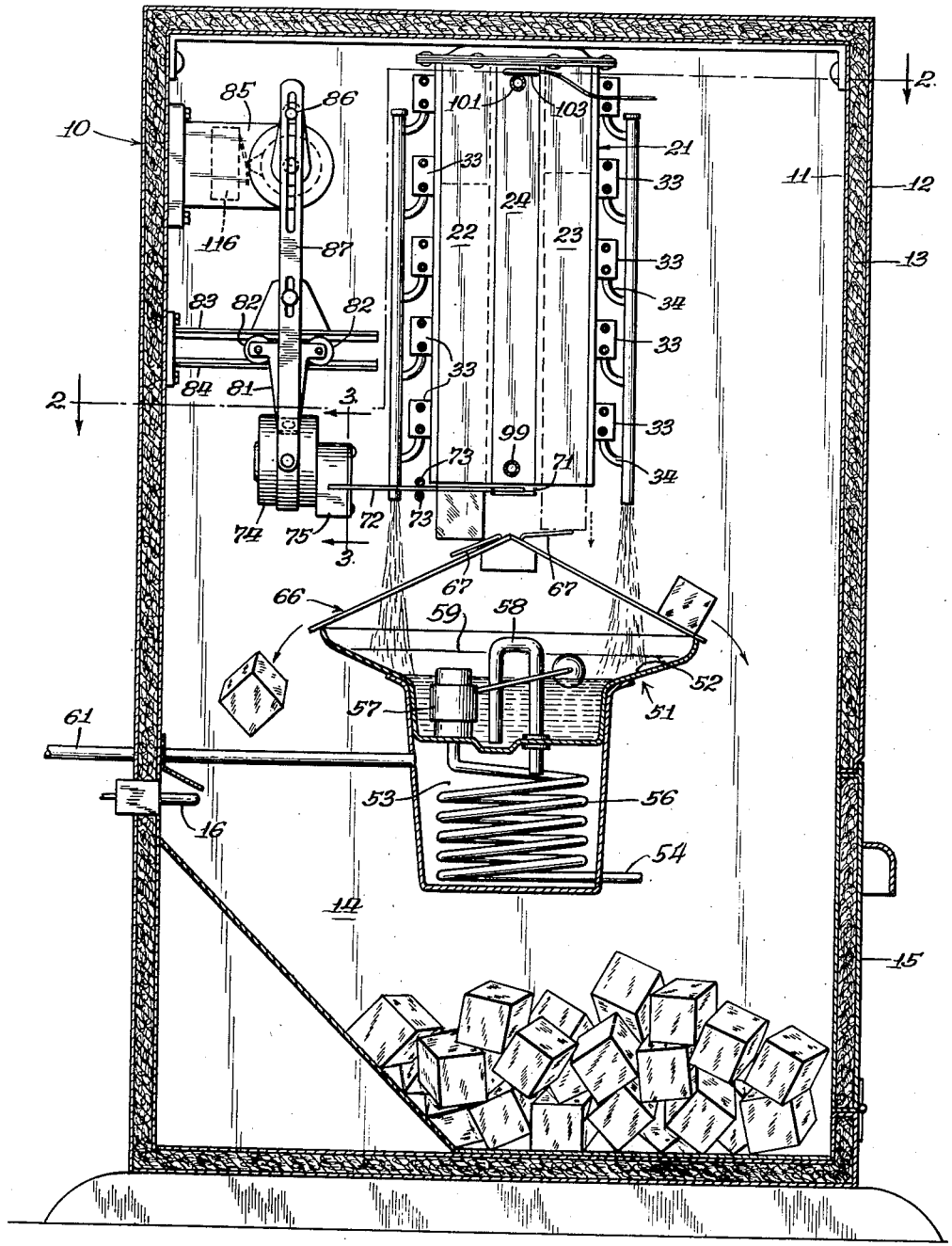
Figure 1 is a vertical sectional view through an ice making machine constructed in accordance with this disclosure.

As illustrated, the entire mechanism is enclosed within a cabinet 10 which may be of generally rectangular form and which is preferably povided with an inside liner 11 and outside housing 12 supported by appropriate frame members (not shown) and insulated from each other by thermal insulation 13. An ice bin 14 is at the bottom of the cabinet with a front door 15 arranged to provide access to the ice in the bin. A thermostat bulb 16 is provided in the upper portion of the bin to stop the machine when the bin is filled with ice, as will appear.

Figure 2:
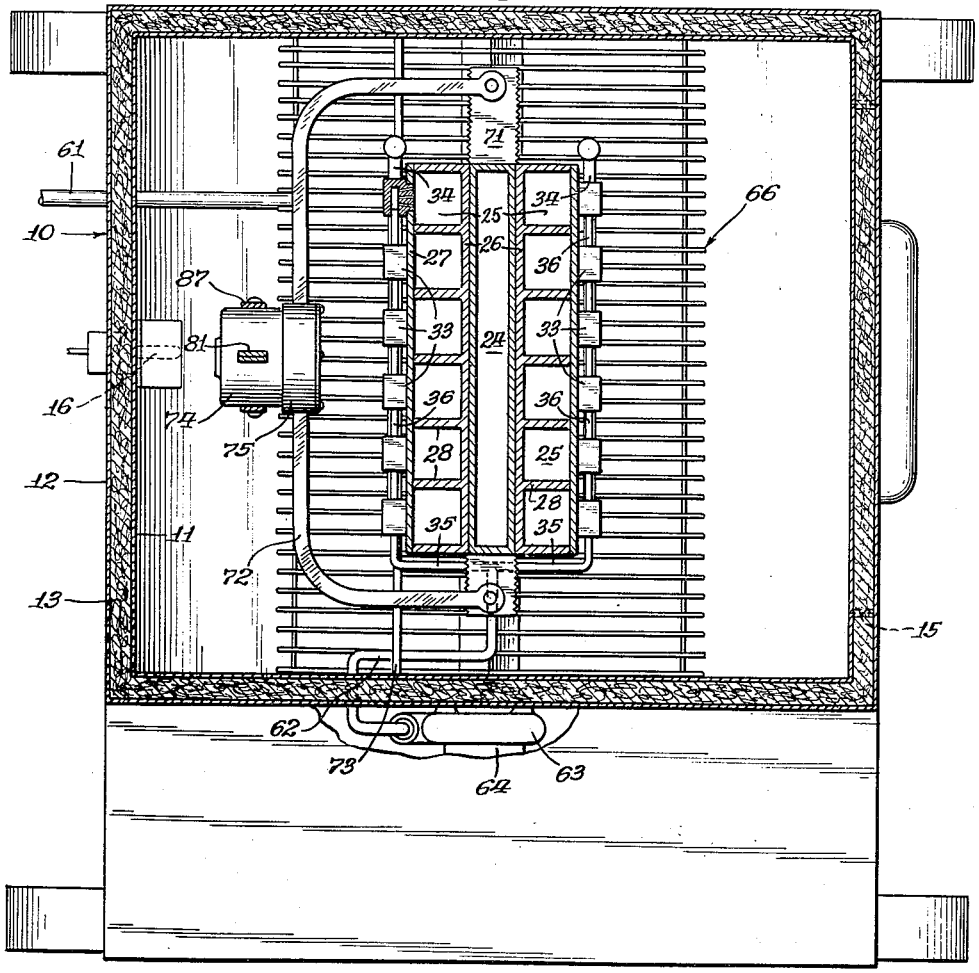
Figure 2 is a plan view thereof, partially in section.
Figure 7:
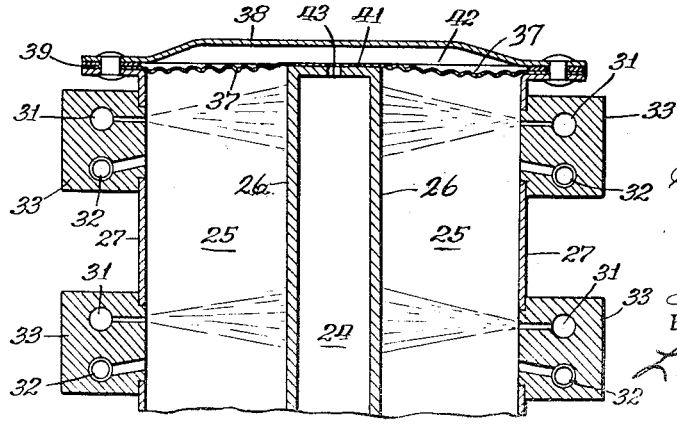
Figure 7 is a detail sectional view taken through one of the individual freezing cells of the device.

The ice making assembly 21 of the device, best shown in Figures 1, 2 and 7 consists of a pair of freezing units 22 and 23, each identical to the other but oppositely disposed in back-to-back relation, with a refrigerant evaporator 24 between them. The units 22, 23 are preferably formed of metal or other material having a high degree of thermal conductivity, and include a plurality of vertically extending ice cells 25 defined between the inner walls 26, outer walls 27 and paired side walls 28 of the individual cells. The ice cells 25 are shown as being square in cross section with parallel vertical walls and may be of any convenient length, but are preferably so arranged that the length is an even multiple of their transverse dimension. Water inlet and outlet ports 31 and 32 are provided in a series of nonmetallic inserts 33, affixed in several locations vertically spaced above each other in the outer wall 27 of each of the ice cells. As illustrated, the outlet ports 32 are coupled to a return line by outlet manifold tubes 34 and a water feed line 35 is connected to each of the inlet ports 31 through plastic inlet manifold tubes 36. The evaporator 24 may comprise conventional refrigeration tubing between the walls 26 of the individual ice cells, but as illustrated it is an open chamber into which the refrigerant is introduced.

The upper end of each of the ice cells 25 is closed by a flexible diaphragm 37. These diaphragms may be of metal or other suitable material, secured to the upper walls of the ice cells and to the upper wall 41 of the evaporator 24 in any appropriate manner, as by riveted or welded flanges 39. The cap 38 thus forms a fluid tight chamber 42 above the diaphragms 37, and in the preferred practice of the invention this chamber is interconnected with the evaporator chamber 24 by a port 43. The diaphragms 37 will thus be actuated by changes of pressure in the refrigerating system, as will appear.

The ice making unit of the machine is disposed immediately above a water preconditioning unit 51 consisting of an open topped reservoir 52 with a sump 53 below it. Water is supplied to the machine from a supply line 54 which enters the sump and passes through a precooling coil 56, from which it extends to a float valve 57 so arranged as to cut off the water supply just before the reservoir is filled.

The reservoir 52 has an internal siphon tube 58 interconnecting it with the sump 53. The short inlet end of the siphon tube extends to the bottom of the reservoir, and the longer outlet end of the siphon extends through the bottom of the reservoir into the sump. The uppermost arch portion of the siphon is disposed just above the normal maximum water level line 59. The sump 53 is also provided with a drain outlet 61 taken from a point just below the bottom of the reservoir.

The water to be frozen in the freezing units 22 and 23 is supplied from the line 54, and is precooled in the coil 56 before it enters the reservoir through the valve 57. From the reservoir, the water is circulated upwardly through tube 62 to the water inlet manifold tubes 36 and thence to the cells 25. This is done by a centrifugal pump 63 driven by motor 64. The continuous circulation of water up into the several cells 25 of the freezing units permits the water to be frozen in these chambers under conditions of continuous flow, with the excess water carried away by the outlet manifolds and thence returned to the reservoir. An open wire guard 66 is placed above the reservoir, with its opposite side slanting outwardly and downwardly. This allows any water dripping from the freezing units to enter the reservoir, but deflects pieces of ice into the bin below. A pair of switches 67 are secured at the apex of the guard, to be actuated by bars of ice discharged from the ice cells.

Figure 3:
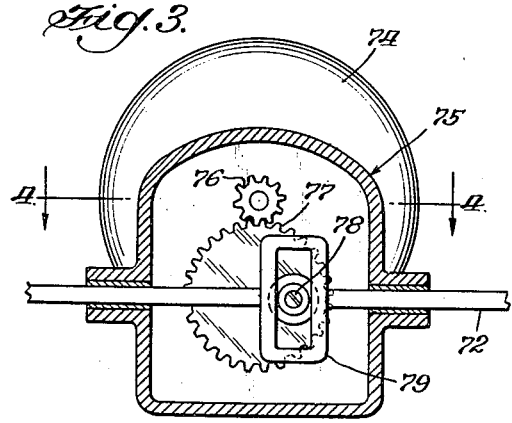
Figure 3 is a detail sectional view taken substantially on the plane of the line 3—3 of Figure 1.
Figure 4:
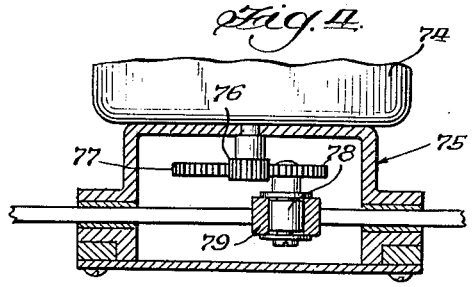
Figure 4 is a detail sectional view taken substantially on the plane of the line 4—4 of Figure 3.

In the present machine, the ice is frozen in the vertical cells 25 as upright columns or "bars" of ice, which are thereafter cut into cubes of convenient size. The cube severing devices, best illustrated in Figures 1 and 2, include a double edged saw 71 mounted on a horizontal frame 72 guided between paired rollers 73 and driven in longitudinal reciprocation by a motor 74 working through a gear box 75. The gear box may include any appropriate mechanical movement for this purpose, as for example the movement illustrated in Figures 3 and 4, wherein the pinion 76 of the motor drives a gear 77 having a crank pin 78 working in the cross slot of the yoke 79 interconnecting the opposite end members of the saw frame 72. The entire saw mechanism is also mounted for back-and-forth movement in a horizontal direction transverse to the stroke of the saw, to advance it in either direction, as required. This may be accomplished by any appropriate means, as by mounting the motor 74 and gear box 75 on a bracket 81 carried by paired rollers 82 operating between guides 83 and 84. A traverse motor 85, equipped with speed reducer, is coupled to the shiftable saw drive assembly by a crank pin 86, working in a slot within a rocker arm 87. It follows that the saw blade may assume a neutral position directly under the evaporator 24 or may be advanced to left or right to sever bars of ice which may have been released from the freezing cells and allowed to slide down into contact with the wire guard over the reservoir, tripping a trigger switch 67.

Figure 5:
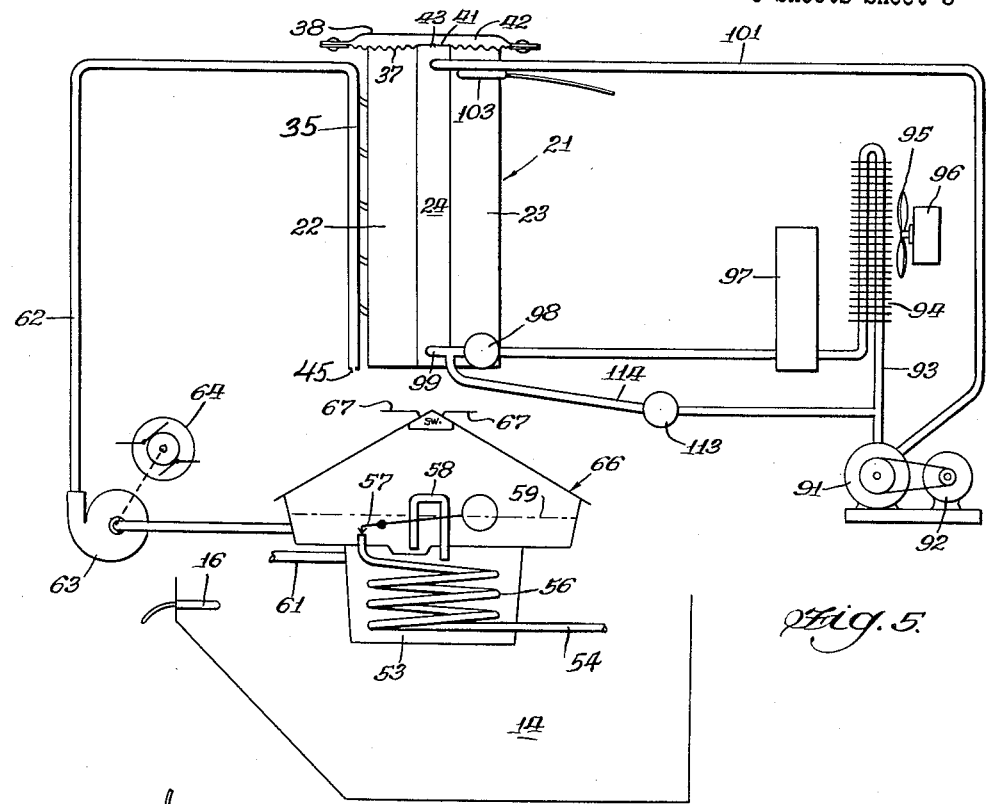
Figure 5 is a flow diagram of the water supply system and refrigeration system contemplated for an ice making machine according to this invention.

The evaporator 24 is supplied with liquid refrigerant from an appropriate refrigeration system, which may be substantially as diagrammatically illustrated in Figure 5. As shown, the refrigeration system includes a compressor 91 driven by a motor 92 and arranged to deliver compressed gaseous refrigerant through a high pressure line 93 to a condenser 94 cooled by a fan 95 driven by motor 96. The refrigerant from the condenser 94 flows to an accumulator 97 and thence through an expansion valve 98 to the inlet line 99 of the evaporator. A return line 101 extends from the upper end of the evaporator back to the compressor 91. A thermostatic control bulb 103 is in contact with the refrigerant system near the junction of the return line 101 and the evaporator 24. The thermostat bulb 103 (Figure 5) serves to control a single pole double throw switch 104 actuated by bellows 105 (Figure 6) to effect electrical control of the freezing cycle of the apparatus.

During the normal freezing cycle the float valve 57 maintains the water level in the reservoir about as shown, and the operation of the motor 64 causes the pump 63 to continuously recirculate water upwardly from the reservoir 52 to the ice cells, injecting it into the individual cells 25 through the several inlet ports 31 spaced along the outer wall of each cell. It will be understood, of course, that much of this water will be discharged downwardly through the open bottoms of the cells, but since the walls of the cells are refrigerated a layer of ice will be built up within each individual cell. The ice will grow progressively thicker as the circulation continues, and in normal operation the ice will become thicker near the bottom of the cells than in the upper portions thereof, so that the bottoms of the cells will gradually freeze over. Progressive freezing upwardly will also close the inlet and outlet ports in the outer walls of the individual cells in turn, generally from the bottom up. It should be noted, however, that as the lower ports are closed by the formation of ice, circulation is maintained through the upper inlet and outlet ports, until the cells are entirely frozen solid with a vertical column or bar of ice in each cell. Bleeder apertures 45 are provided in the ends of the water inlet manifold tubes 36 to maintain enough circulation to prevent freezing of the lines.

Figure 6:
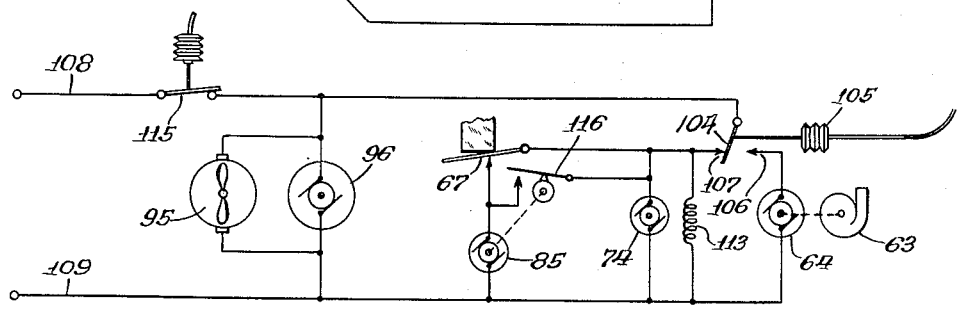
Figure 6 is a schematic wiring diagram of the electrical control system thereof.

When the ice in the cells is properly frozen, each cell contains a bar of solid, crystal-clear ice, without porousness or cloudiness. When the freezing is completed, the temperature of the evaporator at the junction of the return line 101 falls sufficiently to cause the thermostat bulb 103 to actuate switch 104, moving it from contact 106 to contact 107 (Figure 6). This interrupts the circuit between the lines 108 and 109, and stops operation of the motor 64 and water pump 63. The closing of contacts 104 and 107 completes a circuit from power line 108 to ice switch 67, to saw driving motor 74 and to a solenoid "hot valve" 113 in a bypass line 114 between the high pressure line 93 of the refrigerant compressor and the inlet to the evaporator 24. The opening of the valve 113 allows hot refrigerant to flow directly from the compressor to the evaporator 24, thus heating the walls of the ice cells 25 sufficiently to free the bars or columns of ice therein and allow the ice to slide downwardly from the lower ends of the individual cells. The movement of the ice is facilitated by the flexible diaphragms 37, which tend to flex downwardly under the high pressure of the hot refrigerant, and exert a downward force on the individual bars of ice. Since operation of the thermostatic switch 104 has closed the circuit to the saw driving motor 74, the saw 71 begins to reciprocate, but remains in its neutral position below the evaporator. As soon as one or more of the columns of ice is freed from its cell sufficiently to slide down and engage a trigger of switch 67, it will close a circuit through the saw traverse motor 85. This acts through the rocker arm 87 (Figure 1) to advance the saw alternately to the right and to the left, cutting individual ice cubes from the lower ends of the bars of ice projecting from the bottom of the freezing unit. As these ice cubes are severed they drop to the inclined surface of the guard 66 and slide downwardly into the pin 14. When the ice in the bin reaches the level of thermostat bulb 16 it will act to open line switch 115 and shut down operation of the machine.

When the sawing operation has been completed, the ice switch 67 opens, interrupting the starting circuit to the saw traverse motor 85, but an auxiliary cam-controlled switch 116 is provided to keep the motor energized until it reaches its neutral or intermediate position, between the columns of ice and directly below the evaporator 24.

As the ice is being loosened from within the cells, the circulating pump 63 has ceased its operation and the water in the manifold tubes, together with any water produced by the thawing necessary to free the ice from the cells, falls into the reservoir 52. Since this is sufficient to raise the water level in the reservoir slightly above the normal water line 59 established by the float valve and above the top of the siphon 57, it will start a flow through the siphon and into the sump 53. This flow will continue until all water is drained from the reservoir, since the rate of flow outwardly through the siphon is considerably greater than the rate of inward flow through the float valve 57. This action clears the reservoir of dreg water which contains an unduly large percentage of impurities after the freezing operation has been completed. Also, it transfers the cold dreg water into the sump where it is utilized to pre-cool the incoming fresh water passing through the coil 56 to be used in the next freezing cycle.

The apparatus disclosed in the present specification is of advantage over ice making machines heretofore known in several important respects. For one thing, it permits the freezing of ice in larger pieces than the individual cubes desired as an end product and thus permits the use of a freezing assembly of simpler design and construction. Also, it accomplishes efficient freezing without undue consumption of power to accomplish the freeing of the ice from the ice cells and the cutting of the ice into cubes. These objects are accomplished, moreover, without sacrifice of the recognized advantages following the use of a constant flow freezing system, wherein the ice is frozen from continuously moving water. This constant flow freezing, as described herein, allows the ice to freeze into completely solid crystal clear bars, without holes, porosity or cloudiness. It also permits the progressive freezing of water within confined freezing cells in a manner to progressively build up the thickness of the ice, yet without sufficient tendency for expansion as to damage the cells.

In addition, it is well known that constant flow freezing is in itself a purification process such that only pure water is incorporated into the ice product. It follows that most of the unwanted minerals and impurities present in the supply water are returned to the reservoir and discharged as dregs. In addition, the arrangement provides for precooling of the incoming water to afford the greatest possible degree of thermal efficiency of the apparatus.

Having thus described my invention, what I claim as new and desire to protect by United States Letters Patent is:

1. In an ice making machine, in combination, an upright freezing cell of height greatly exceeding its thickness, with an open bottom, at least one water inlet port and a plurality of water outlet ports vertically spaced with respect to each other in an unrefrigerated cell wall with means for supplying refrigerant to said cell under relatively low pressure to cool the cells and freeze an upright bar of ice therein, means for supplying refrigerant to said chamber under substantially higher pressure to free the ice therefrom, a shiftable member closing the top of said cell adapted to bear against the upper end of the bar of ice therein and eject it downwardly from the cell, and means to cut a plurality of ice cubes from the lower end of said bar of ice as it is ejected from the cell.

2. In an ice making machine, in combination, an upright freezing cell of square cross section consisting of two pairs of substantially vertical walls, said cell being of height greatly exceeding its thickness, with an open bottom, at least one water inlet port and a plurality of water outlet ports vertically spaced with respect to each other in an unrefrigerated cell wall with a refrigerant chamber in thermal contact with at least one of said side walls, means for supplying refrigerant to said chamber under relatively low pressure to cool the walls of the cells and freeze an upright bar of ice therein, means to heat said walls and free the ice therefrom, and means to cut a plurality of ice cubes from the lower end of said bar of ice as it is ejected from the cell.

3. In an ice making machine, in combination, an upright freezing cell of square cross section consisting of two pairs of substantially vertical walls, said cell being of height greatly exceeding its thickness, with an open bottom, at least one water inlet port and a plurality of water outlet ports vertically spaced with respect to each other in an unrefrigerated cell wall with a refrigerant chamber in thermal contact with at least one of said side walls, means for supplying refrigerant to said chamber under relatively low pressure to cool the walls of the cells and freeze an upright bar of ice therein, means to heat said walls and free the ice therefrom, a shiftable member closing the top of each of said cell adapted to bear against the upper end of the bar of ice therein and eject it downwardly from the cell, a fluid chamber in communication with the aforesaid refrigerant chamber to apply force to said shiftable member, and means to cut a plurality of ice cubes from the lower end of said bar of ice as it is ejected from the cell.

4. In an ice making machine, in combination, an upright freezing cell of square cross section consisting of two pairs of substantially vertical walls, said cell being of height greatly exceeding its thickness, with an open bottom, at least one water inlet port, a plurality of outlet ports spaced from each other and positioned at different levels of the freezing cell; a refrigerant chamber in thermal contact with at least one of said side walls, means for supplying refrigerant to said chamber under relatively low pressure to cool the walls of the cells and freeze an upright bar of ice therein, means for supplying refrigerant to said chamber under substantially higher pressure to heat said walls and free the ice therefrom, and means to cut a plurality of ice cubes from the lower ends of said bar of ice as it is ejected from the cell.

5. In an ice making machine, in combination, an upright freezing cell of square cross section consisting of two pairs of substantially vertical walls, said cell being of height greatly exceeding its thickness, with an open bottom, at least one water inlet port, a refrigerant chamber in thermal contact with at least one of said side walls, means for supplying refrigerant to said chamber under relatively low pressure to cool the walls of the cells and freeze an upright bar of ice therein, means for supplying refrigerant to said chamber under substantially higher pressure to heat said walls and free the ice therefrom, a shiftable member closing the top of each of said cell adapted to bear against the upper end of the bar of ice therein and eject it downwardly from the cell, a fluid chamber in communication with the aforesaid refrigerant chamber to apply force to said shiftable member, and means to cut a plurality of ice cubes from the lower end of said bar of ice as it is ejected from the cell.

6. In an ice making machine, in combination, an upright freezing cell of square cross section consisting of two pairs of substantially vertical walls, said cell being of height greatly exceeding its thickness, with an open bottom, at least one water inlet port and a plurality of water outlet ports vertically spaced with respect to each other in an unrefrigerated cell wall with a plurality of water outlet ports vertically spaced along at least one of said side walls, a refrigerant chamber in thermal contact with at least one of said side walls, means for supplying refrigerant to said chamber under relatively low pressure to cool the walls of the cells and freeze an upright bar of ice therein, means for supplying refrigerant to said chamber under substantially higher pressure to heat said walls and free the ice therefrom, a shiftable member consisting of a yieldable diaphragm closing the top of said cell adapted to bear against the upper end of the bar of ice therein and eject it downwardly from the cell, a fluid chamber in communication with the aforesaid refrigerant chamber to apply force to said shiftable member, and means to cut a plurality of ice cubes from the lower end of said bar of ice as it is ejected from the cell.

7. In an automatic ice making machine, an ice making unit comprising a plurality of upright ice cells each open at the bottom with at least one water inlet port and a series of outlet ports in vertical alignment along one upright wall of each cell; in combination with a water reservoir disposed below the ice making unit; means for supplying said reservoir with water; means for recirculating water from the reservoir through the ice cells as the freezing of ice therein progresses; means for heating the ice cells to release ice therefrom for downward discharge from the ice making unit; stop means to limit the movement of said bars of ice, and saw means for progressively severing individual pieces of ice from the lowermost ends of said bars of ice after downward movement thereof.

8. In an automatic ice making machine, an ice making unit comprising a plurality of upright ice cells each square in cross section and having a height greatly exceeding its transverse dimensions; said cells consisting of four metallic walls open at the bottom with a plurality of water inlet ports and a plurality of water outlet ports spaced apart from each other and positioned at different levels along an upright wall of each cell; in combination with a water reservoir disposed below the ice making unit to receive excess water from said cells; means for supplying said reservoir with water, means for recirculating water from the reservoir through the ice cells as the freezing of ice therein progresses, means for heating the walls of the ice cells to release elongated bars of ice therefrom for downward discharge from the ice making unit; stop means to limit the movement of said bars of ice to a distance substantially equal to their thickness, and saw means for progressively severing individual cubes of ice from the lowermost ends of said bars of ice after downward movement thereof.

References Cited in the file of this patent

UNITED STATES PATENTS

| | | |
|---|---|---|
| 2,145,773 | Muffly | Jan. 31, 1939 |
| 2,429,699 | Sharp | Oct. 28, 1947 |
| 2,533,616 | Pace | Dec. 12, 1950 |
| 2,542,892 | Bayston | Feb. 20, 1951 |
| 2,549,747 | Leeson | Apr. 17, 1951 |
| 2,585,498 | Rear | Feb. 12, 1952 |
| 2,598,430 | Pownall | May 27, 1952 |
| 2,775,100 | Howe | Dec. 25, 1956 |